United States Patent [19]
Arimilli et al.

[11] Patent Number: 5,623,694
[45] Date of Patent: Apr. 22, 1997

[54] ABORTING AN I/O OPERATION STARTED BEFORE ALL SYSTEM DATA IS RECEIVED BY THE I/O CONTROLLER AFTER DETECTING A REMOTE RETRY OPERATION

[75] Inventors: Ravi K. Arimilli, Round Rock; John S. Dodson, Pflugerville; Jerry D. Lewis, Round Rock, all of Tex.

[73] Assignee: International Business Machines Corporation, Armonk, N.Y.

[21] Appl. No.: 316,978

[22] Filed: Oct. 3, 1994

[51] Int. Cl.⁶ .................................................. G06F 13/00
[52] U.S. Cl. ............................................................ 395/825
[58] Field of Search .................................. 395/825, 849, 395/879, 375

[56] References Cited

U.S. PATENT DOCUMENTS

| | | | |
|---|---|---|---|
| 4,706,190 | 11/1987 | Bomba et al. | 364/200 |
| 4,878,166 | 10/1989 | Johnson et al. | 364/200 |
| 4,908,823 | 3/1990 | Haagens et al. | 370/85.1 |
| 4,947,366 | 8/1990 | Johnson | 364/900 |
| 5,007,051 | 4/1991 | Dolkas et al. | 370/85.1 |
| 5,072,364 | 12/1991 | Jardine et al. | 395/375 |
| 5,142,672 | 8/1992 | Johnson et al. | 395/500 |
| 5,150,467 | 9/1992 | Hayes et al. | 395/325 |
| 5,420,991 | 5/1995 | Konigsfeld et al. | 395/375 |
| 5,454,117 | 9/1995 | Puziol et al. | 395/800 |
| 5,553,255 | 9/1996 | Jain et al. | 395/375 |

FOREIGN PATENT DOCUMENTS

| | | |
|---|---|---|
| 0178670A2 | 4/1986 | European Pat. Off. . |
| 0184320A1 | 11/1986 | European Pat. Off. . |

Primary Examiner—Thomas C. Lee
Assistant Examiner—Duo Chen
Attorney, Agent, or Firm—Jenkens & Gilchrist

[57] ABSTRACT

A data processing system includes one or more processing units, a memory subsystem, and one or more input/output channel controllers, wherein each of the input/output channel controllers include the capability of speculative input/output execution. The speculative I/O execution technique according to the present invention may include several options. The speculative execution in the IOCC begins after receiving a raw address even though the operation can still be remotely retried. The programmed I/O latency time is reduced significantly due to the early speculative commencement of the IOCC operation. The IOCC may have to abort the speculative operation if a remote flow control retry is received. If, however, no retry is received then significant time is saved because the speculative operation proceeds.

7 Claims, 4 Drawing Sheets

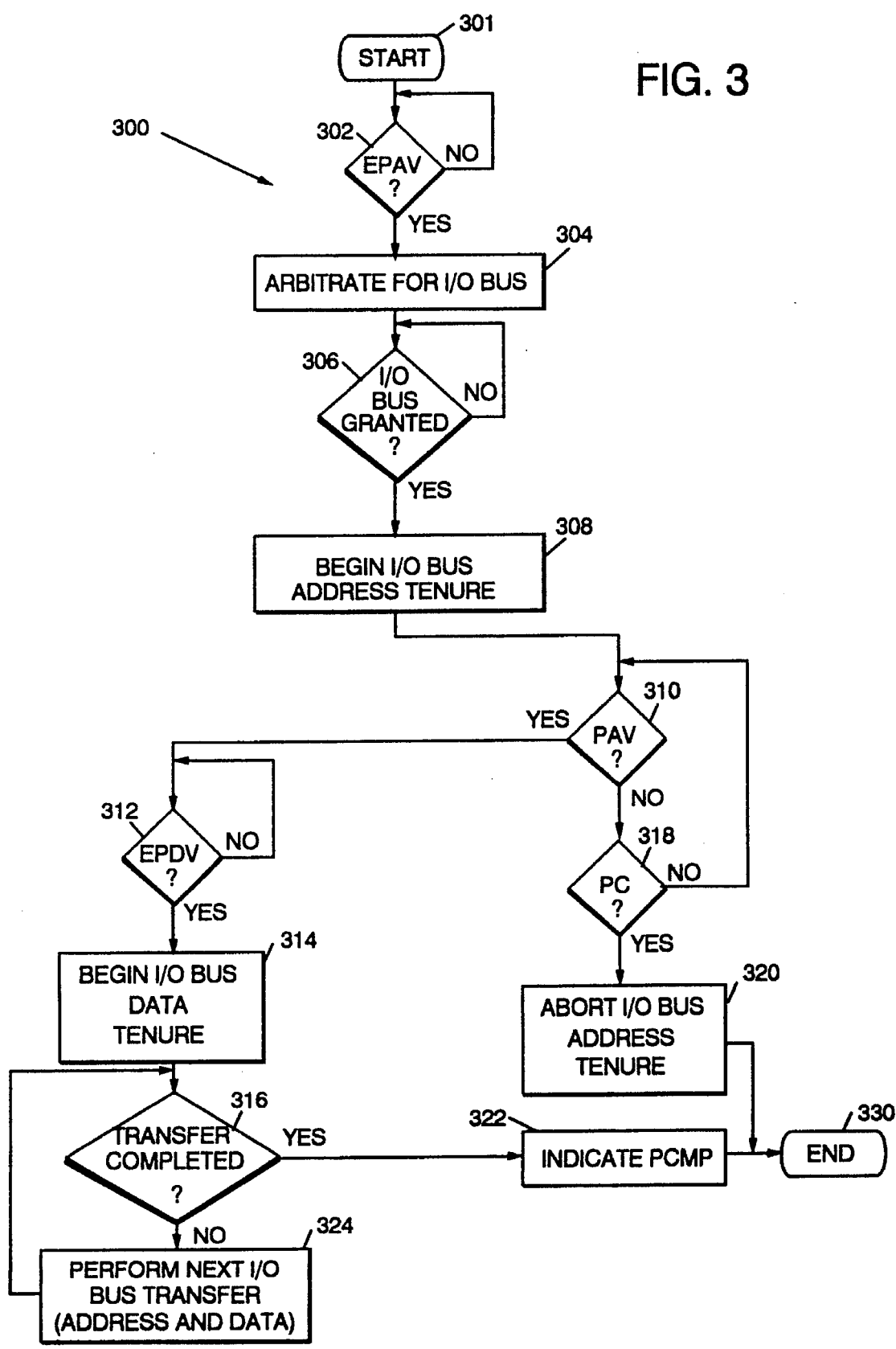

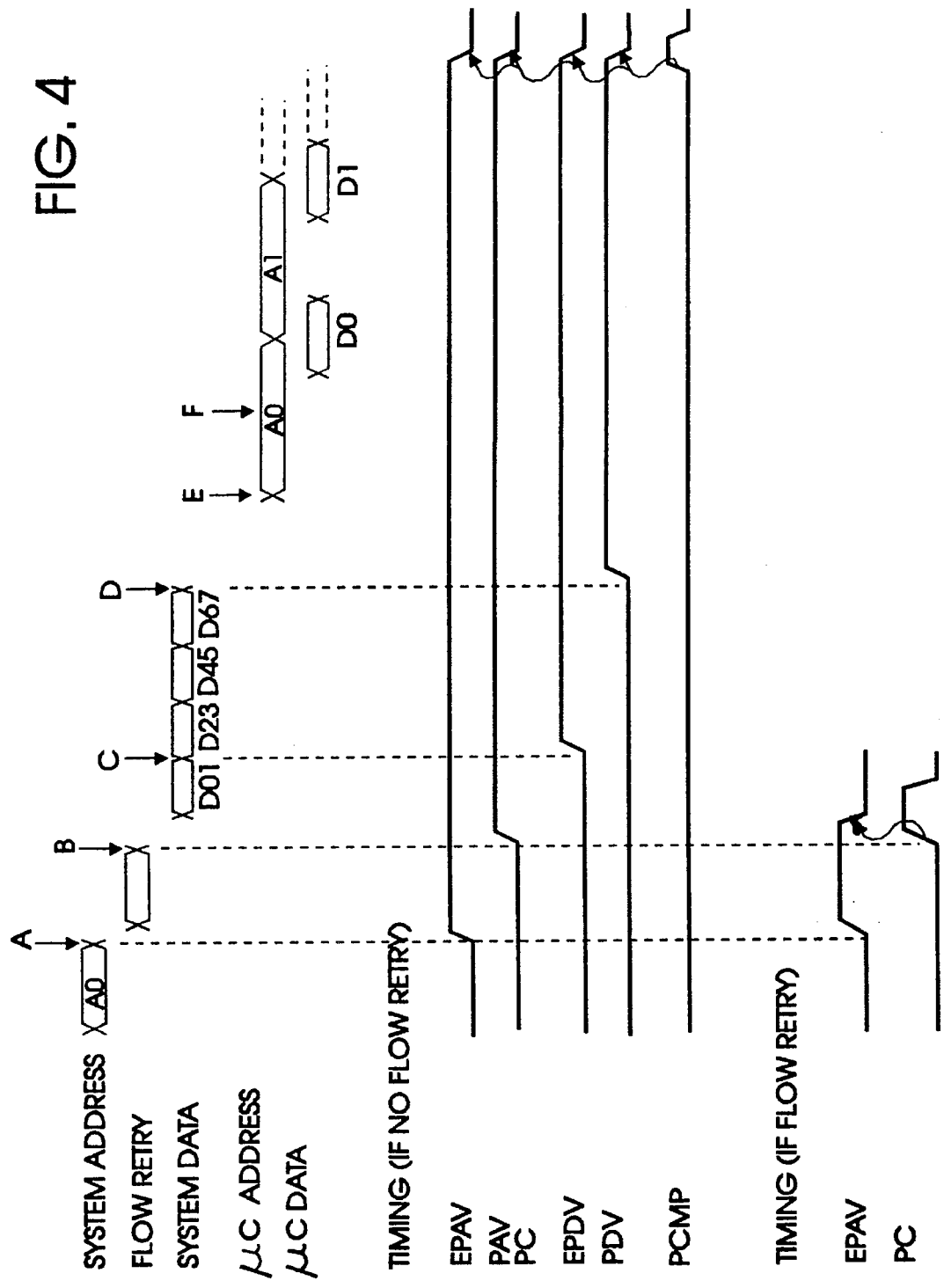

ABORTING AN I/O OPERATION STARTED BEFORE ALL SYSTEM DATA IS RECEIVED BY THE I/O CONTROLLER AFTER DETECTING A REMOTE RETRY OPERATION

CROSS REFERENCE TO RELATED APPLICATIONS

This application for patent is related to the following applications for patent filed concurrently herewith:

EFFICIENT ADDRESS TRANSFER TECHNIQUE FOR A DATA PROCESSING SYSTEM, Ser. No. 08/317,007, still pending;

DUAL LATENCY STATUS AND COHERENCY REPORTING FOR A MULTIPROCESSING SYSTEM, Ser. No. 08/316,980, still pending;

SYSTEM AND METHOD FOR DETERMINING SOURCE OF DATA IN A SYSTEM WITH INTERVENING CACHES, Ser. No. 08/317,256, still pending;

QUEUED ARBITRATION MECHANISM FOR DATA PROCESSING SYSTEM, Ser. No. 08/317,006, still pending;

ARRAY CLOCKING METHOD AND APPARATUS FOR INPUT/OUTPUT SUBSYSTEMS, now U.S. Pat. No. 5,548,797;

DATA PROCESSING SYSTEM HAVING DEMAND BASED WRITE THROUGH CACHE WITH ENFORCED ORDERING, Ser. No. 08/316,979, still pending;

COHERENCY AND SYNCHRONIZATION MECHANISMS FOR I/O CHANNEL CONTROLLERS IN A DATA PROCESSING SYSTEM, Ser. No. 08/316,977, still pending;

ALTERNATING DATA VALID CONTROL SIGNALS FOR HIGH PERFORMANCE DATA TRANSFER, Ser. No. 08/326,190, still pending;

LOW LATENCY ERROR REPORTING FOR HIGH PERFORMANCE BUS, Ser. No. 08/326,203, still pending.

Each of such cross-referenced applications are hereby incorporated by reference into this Application as though fully set forth herein.

BACKGROUND OF THE INVENTION

1. Field of the Invention

The present invention relates to data processing systems, and more particularly to data processing systems having one or more processors and one or more input/output channel controllers wherein the system allows remote retry and speculative execution to improve system performance.

2. Prior Art

Input/output channel controllers ("IOCCs") are typically used in computer systems to generate industry standard I/O buses from high performance system/memory buses. These IOCCs act as bridges between system memory and I/O devices for DMA (direct memory access) operations and a bridge between processors and I/O devices for programmed input/output operations (PIO).

In a prior art system, a system bus includes snooping and retry protocols to support coherent memory access. For example, when processor A performs a memory read for data which exists in processor B's cache, then B will perform a retry to A's memory request. Furthermore, other bus devices may also perform a retry if they are unable to snoop their internal caches. However, when A performs an I/O read from IOCC C, then only IOCC C is allowed to retry the operation. (This type of retry is known in the art as flow control retry.) Thus, coherency retry was allowed in the prior art by a foreign device during memory operations, but flow control retry was only allowed by the targeted slave device during I/O operations.

If a data processing system allows a foreign device to indicate flow control retry as well as the targeted slave device, then the system design complexity may be significantly reduced and numerous system performance options may be realizable. However, there is one disadvantage in that the targeted slave may introduce some latency to the requested operation. Normally, the targeted slave is allowed to begin executing an operation as soon as it is received from the system bus, since it is the only device which can retry the operation. With a system bus allowing remote flow control retry capability, the targeted slave device must wait until the retry window before it can execute the operation thus introducing latency.

SUMMARY OF THE INVENTION

Therefore, it is an object of the present invention to allow remote flow control retry operations in a data processing system.

It is another object of the present invention to allow remote flow control retry operations in a data processing system which includes the capability of speculative input/output execution.

Accordingly, a data processing system includes one or more processing units, a memory subsystem, and one or more input/output channel controllers, wherein each of the input/output channel controllers include the capability of speculative input/output execution. The speculative execution in the IOCC begins after receiving a "raw" address even though the operation can still be remotely retried. The programmed I/O (PIO) latency time is reduced significantly due to the early speculative commencement of the IOCC operation. The IOCC may have to abort the speculative operation if a remote flow control retry is received. If, however, no retry is received then significant time is saved because the speculative operation proceeds.

There is still the possibility of the IOCC having to wait for data from the processor if the requested operation is for a store to an I/O device.

It is a feature and advantage of the present invention that speculative address execution of IOCC operations with remote flow control retry capability significantly improves system performance.

It is another feature of the present invention that speculative data execution of IOCC STORE operations further improves system performance.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 is a flow chart showing the operation of the method in accordance with the present invention.

FIG. 4 is a timing diagram of the speculative I/O execution in accordance with the present invention.

DESCRIPTION OF A PREFERRED EMBODIMENT OF THE INVENTION

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
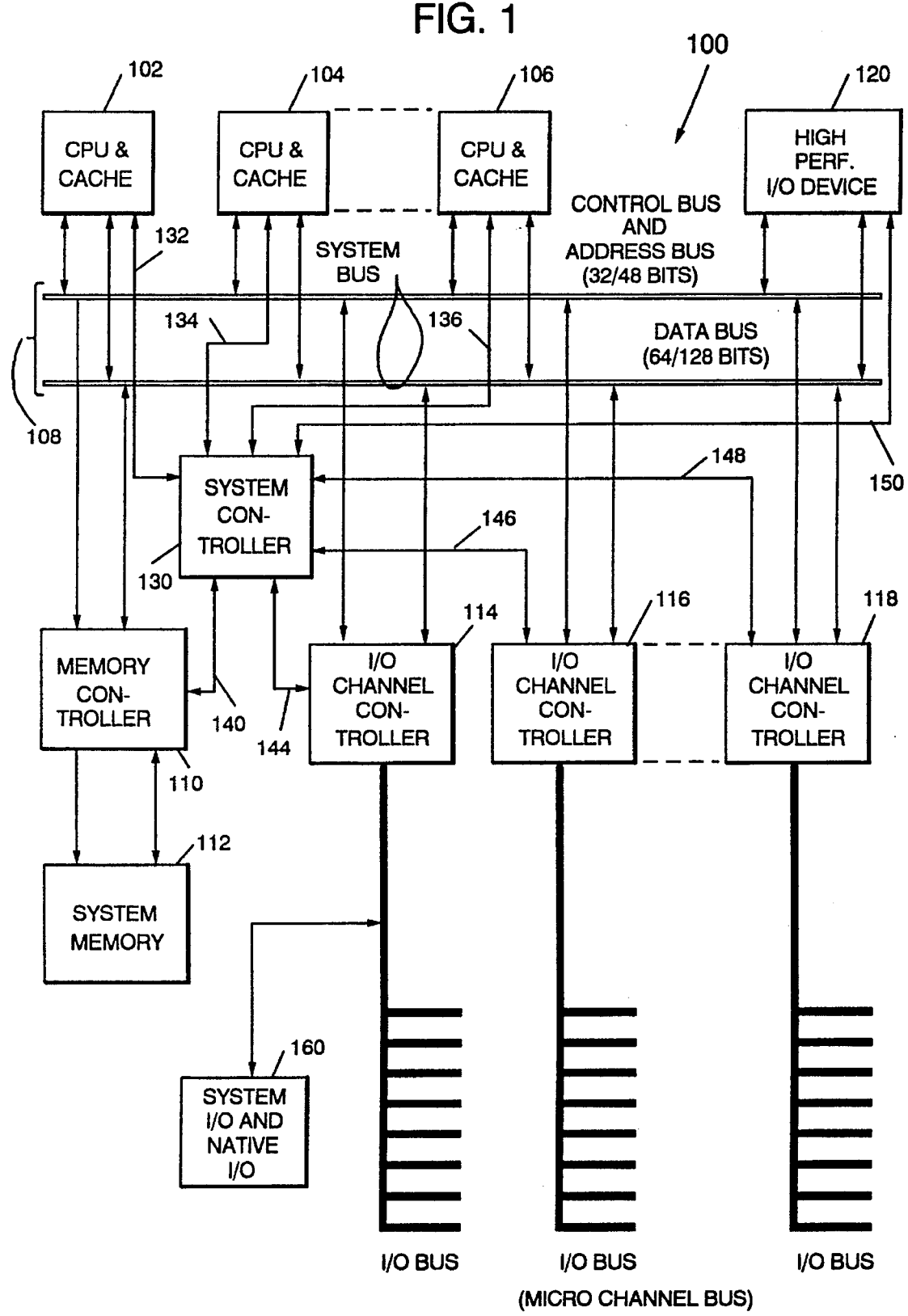
FIG. 1 is a system block diagram of a data processing system embodying the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102–120, inclusive, operate under the control of system controller 130 which communicates with each unit connected to the system bus 108 by point to point lines such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

Figure 2:
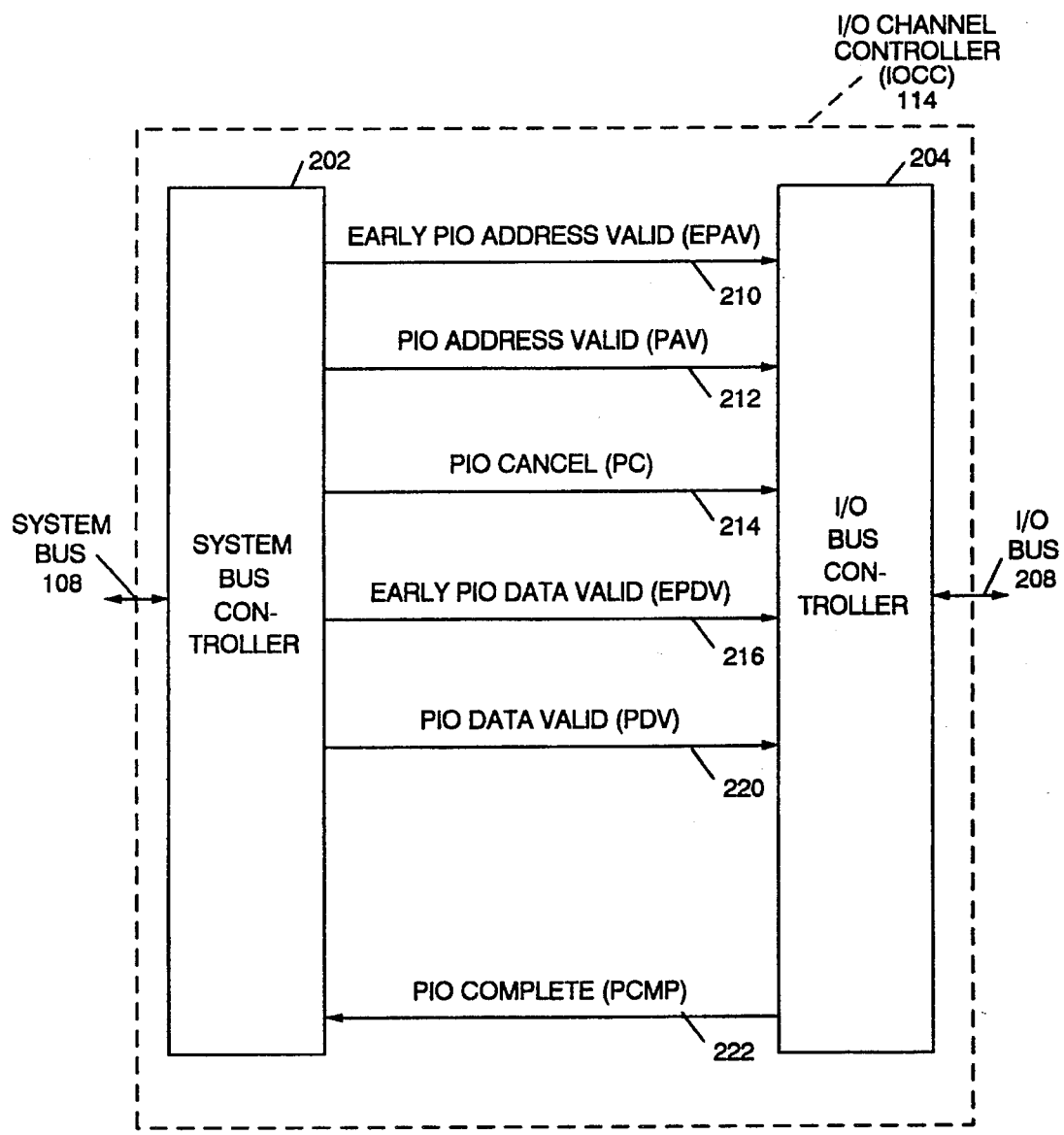
FIG. 2 is a block diagram of an input/output channel controller including speculative I/O execution and remote flow control retry capability in accordance with the present invention.

Referring now to FIG. 2, that aspect of the input/output channel controller 114 which relates to the present invention will be described. IOCC 114 has a system bus controller 202 which connects to system bus 108 (see FIG. 1) and an I/O bus controller 204 which connects to I/O bus 208. The various signals which are transmitted between the system bus controller 202 and the I/O bus controller 204 will be more fully described with respect to FIG. 3. The speculative I/O execution process starts 301 with a test to determine if early PIO address is valid (EPAV) 302 on line 210 from system bus controller 202 to I/O bus controller 204. If EPAV is not valid, the process loops until EPAV is true. Once EPAV is true, the I/O bus 208 is arbitrated for 304 and the process loops in step 306 until the I/O bus is granted. Once the I/O bus is granted, the I/O bus address tenure is begun 308.

Next a test is made to determine if the PIO address is valid (PAV) 310 on lines 212. If true, a test is made to determine if the early PIO data is valid (EPDV) 312 on lines 216. The process loops until the EPVD is true and then begins the I/O bus data tenure 314. A test is made to determine if the data transfer is complete 316 and if not the next I/O bus transfer of address and data is performed 324. The process loops between the testing for transfer complete and the transfer of the next address and data until transfer complete is true at which time PIO complete (PCMP) is indicated 322 and the process ends 330. If the PIO address valid is false, 310, a test is made to determine if the PIO cancel (PC) is true on lines 214. If PIO cancel is false, the process loops back to test for PAV step 310. This loop continues until PAV is true or PC is true. If PC is true on line 214, an abort I/O bus tenure is performed 320 and the process ends 330. PIO cancel indicates that a remote flow control retry has occurred which aborts the PIO.

Referring now to FIG. 4, the timing diagram showing PIO execution, additional features of the present invention will be described.

A system address is read A0 and is considered to be valid at A. At this time, EPAV becomes valid and remains valid until either the receipt of a PIO cancel (PC) indicating a flow retry which will cancel the PIO operation or until a PCMP signal indicating that the PIO operation has been completed in a situation where no flow retry was attempted. The remote flow control retry timing for the EPAV and PC signal is shown at the bottom of FIG. 4 wherein the PC signal becomes active when the flow retry signal is stable at B. If no flow retry is attempted, significant time saving is achieved since the I/O bus address and data can be started as soon as the EPAV is true. Thus, again referring to FIG. 4 a time saving of from A to E is achieved by the use of the speculative I/O execution in accordance with the present invention.

If there is no remote flow control retry, I/O bus controller 204 checks to see if the first data D01 has been received from system bus 108. If the first data has been received, the PIO operation may continue until complete at which time the PIO ends with a PIO complete signal PCMP. If the first data from system bus 108 has not been received, the PIO operation is held until the first data from the system bus 108 has been received. Referring again to FIG. 4, it can be seen that the early PIO data valid signal rises after data D01 has been received at C.

Since the rate for both address and data transmission on the system bus 108 is many times faster than the rate for transmission of address and data on I/O bus 208, once the first data D01 is available from system bus controller 202, subsequent data D23, D45, and D67 should be available without stalling the PIO execution.

However, if the system bus 108 data transfer rate is slower than the I/O bus data transfer rate, then one skilled in the art could easily delay the activation of EPDV, in FIG. 4, from time C to time D.

Note that the previously described algorithm and timings are for a PIO store operation. During PIO load operations, the algorithm and timings are similar with the exception that EPDV is not observed.

Although the present invention and its advantages have been described in detail, it should be understood that various changes, substitutions and alterations can be made herein without departing from the spirit and scope of the invention as defined by the appended claims.

What is claimed is:

1. A data processing system, comprising:
   one or more processing units;

one or more I/O controllers;

a system memory;

a system bus, connecting said processing units, said I/O controllers said system memory;

controllers in said system memory; and a system control unit, connected to each device connected to said system bus, for controlling the operation of said processing system;

said I/O controllers further comprising:

means for reading one ore more signals indicating a start of an I/O operation;

means for indicating that said start indicating signals are valid;

means for detecting a remote retry operation;

means for determining system data received valid;

means for holding said I/O operation until said system data received is determined valid;

means for aborting said I/O operation if a remote retry is detected; and means for starting said I/O operation before all of said system data is received by said I/O controller thereby reducing the time required to complete said I/O operation.

2. A data processing system, according to claim 1, wherein said start indicating signals comprise system address signals.

3. A data processing system, according to claim 1, wherein said I/O controller further comprises means for transferring data in accordance with said I/O operation.

4. A data processing system, according to claim 3, further comprising means for determining that said data transfer is complete.

5. A method for improving performance of I/O operations in a data processing system, comprising the steps of:

reading one or more systems indicating a start of an I/O operation;

indicating that said start indicating signals are valid;

detecting a remote retry operation;

determining system data received valid;

holding said I/O operation until said system data received is determined valid;

aborting said I/O operation if a remote retry is detected; and starting said I/O operation before all of said system data is received by said I/O controller thereby reducing the time required to complete said I/O operation.

6. A method of improving performance of I/O operations in a data processing system, according to claim 5, further comprising the step of:

transferring data in accordance with said I/O operation.

7. A method of improving performance of I/O operations in a data processing system, according to claim 5, further comprising the step of:

determining that said data transfer is complete.

* * * * *

UNITED STATES PATENT AND TRADEMARK OFFICE
CERTIFICATE OF CORRECTION

PATENT NO. :  5,623,694

DATED :  April 22, 1997

INVENTOR(S) :  Arimilli et al.

It is certified that error appears in the above-indentified patent and that said Letters Patent is hereby corrected as shown below:

On the title page, and column 1, item [54]:

Title  Should read in its entirety:
--Method and Apparatus for Aborting an I/O Operation Started Before All System Data is Received by the I/O Controller After Detecting a Remote Retry Operation--

Signed and Sealed this

Twenty-fourth Day of June, 1997

Attest:

BRUCE LEHMAN

*Attesting Officer*  *Commissioner of Patents and Trademarks*